(12) United States Patent
Bunker (10) Patent No.: US 10,024,169 B2
(45) Date of Patent: Jul. 17, 2018

(54) ENGINE COMPONENT

(71) Applicant: General Electric Company, Schenectady, NY (US)

(72) Inventor: Ronald Scott Bunker, West Chester, OH (US)

(73) Assignee: General Electric Company, schenectady, NY (US)

( * ) Notice: Subject to any disclaimer, the term of this patent is extended or adjusted under 35 U.S.C. 154(b) by 281 days.

(21) Appl. No.: 14/633,174

(22) Filed: Feb. 27, 2015

(65) Prior Publication Data

US 2016/0251967 A1  Sep. 1, 2016

(51) Int. Cl.
| F01D 5/18 | (2006.01) |
| F01D 9/06 | (2006.01) |
| F23R 3/00 | (2006.01) |
| F23R 3/50 | (2006.01) |

(52) U.S. Cl.
CPC ............. *F01D 5/186* (2013.01); *F01D 9/065* (2013.01); *F23R 3/002* (2013.01); *F05D 2240/81* (2013.01); *F05D 2260/202* (2013.01); *F23R 3/50* (2013.01); *F23R 2900/03042* (2013.01); *Y02T 50/672* (2013.01); *Y02T 50/676* (2013.01)

(58) Field of Classification Search
CPC ..... F01D 5/186; F01D 9/065; F05D 2260/202
See application file for complete search history.

(56) References Cited

U.S. PATENT DOCUMENTS

| 5,577,889 | A | 11/1996 | Terazaki et al. |
| 5,651,662 | A | 7/1997 | Lee et al. |
| 6,092,982 | A | 7/2000 | Ikeda et al. |
| 6,383,602 | B1 | 5/2002 | Fric et al. |
| 6,547,524 | B2 * | 4/2003 | Kohli ...................... F01D 5/186 |
| | | | 415/115 |
| 7,553,534 | B2 | 6/2009 | Bunker |
| 8,057,179 | B1 | 11/2011 | Liang |
| 8,689,568 | B2 | 4/2014 | Kohli et al. |
| 8,763,402 | B2 | 7/2014 | Xu et al. |
| 9,488,057 | B2 | 11/2016 | Jeng et al. |
| 9,644,903 | B1 | 5/2017 | Shyam et al. |
| 2004/0265488 | A1 | 12/2004 | Hardwicke et al. |
| 2013/0205787 | A1 | 8/2013 | Zelesky et al. |

(Continued)

FOREIGN PATENT DOCUMENTS

| EP | 1686240 A1 | 8/2006 |
| EP | 1930546 A2 | 6/2008 |

(Continued)

OTHER PUBLICATIONS

European Search Report and Opinion issued in connection with corresponding EP Application No. 16156597.3 dated Aug. 2, 2016.

(Continued)

*Primary Examiner* — Richard Edgar
*Assistant Examiner* — Michael Sehn
(74) *Attorney, Agent, or Firm* — General Electric Company; William Andes (57) ABSTRACT

An engine component for a gas turbine engine includes a film-cooled substrate having a hot surface facing hot combustion gas flow and a cooling surface facing a cooling fluid flow. A film hole extends through the substrate to an outlet on the hot surface. A flow conditioning structure is provided downstream of the outlet.

20 Claims, 8 Drawing Sheets

(56) References Cited

U.S. PATENT DOCUMENTS

| | | |
|---|---|---|
| 2013/0205792 A1 | 8/2013 | Gleiner et al. |
| 2013/0205801 A1 | 8/2013 | Xu et al. |
| 2013/0209233 A1 | 8/2013 | Xu et al. |
| 2013/0209234 A1 | 8/2013 | Xu |
| 2013/0209269 A1 | 8/2013 | Gleiner et al. |
| 2013/0323080 A1 | 12/2013 | Martin et al. |
| 2016/0281511 A1 | 9/2016 | Hille et al. |

FOREIGN PATENT DOCUMENTS

| | | |
|---|---|---|
| EP | 2592228 A1 | 5/2013 |
| EP | 3034782 A1 | 6/2016 |
| JP | 2012202280 A | 10/2012 |
| JP | 2014214632 A | 11/2014 |

OTHER PUBLICATIONS

European Search Report and Opinion issued in connection with related EP Application No. 16155775.6 dated Aug. 5, 2016.
GE Related Case Form.
U.S. Non-Final Office Action issued in connection with corresponding U.S. Appl. No. 14/633,167 dated Jun. 1, 2017.

* cited by examiner

ENGINE COMPONENT

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, may be necessary. Some engine components include film holes that supply a thin layer or film of cooling fluid on a hot surface of the engine component to protect the engine component from hot combustion gas. Typically, cooling is accomplished by ducting cooler air from the high and/or low pressure compressors to the engine components which require film cooling. The cooling air from the compressor is about 500° C. to 700° C. Although the compressor air is a high temperature, it is cooler relative to the air that passes through the combustion chamber, which may be around 1000° C. to 2000° C.

BRIEF DESCRIPTION OF THE INVENTION

In one aspect, the invention relates to an engine component for a gas turbine engine, the gas turbine engine generating hot combustion gas flow, having a substrate having a hot surface facing the hot combustion gas flow and a cooling surface facing a cooling fluid flow, the hot combustion gas flow generally defining an upstream direction and a downstream direction relative to the hot surface, a film hole extending through the substrate and having an inlet provided on the cooling surface, an outlet provided on the hot surface, and a passage connecting the inlet and the outlet, a flow conditioning structure provided downstream of the outlet on the hot surface, wherein the flow conditioning structure is configured to induce the cooling fluid flow emerging from the outlet to adhere to the hot surface, and a buffer region between the outlet and the flow conditioning structure such that the flow conditioning structure is not physically connected with the film hole.

In another aspect, the invention relates to an engine component for a gas turbine engine, the gas turbine engine generating hot combustion gas flow, having a substrate having a hot surface facing the hot combustion gas flow and a cooling surface facing a cooling fluid flow, the hot combustion gas flow generally defining an upstream direction and a downstream direction relative to the hot surface, a film hole extending through the substrate and having an inlet provided on the cooling surface, an outlet provided on the hot surface, and a passage connecting the inlet and the outlet, a flow conditioning structure comprising a recess in the hot surface provided downstream of the outlet on the hot surface, wherein the recess is configured to induce the cooling fluid flow emerging from the outlet to adhere to the hot surface, and a buffer region between the outlet and the recess such that the recess is not physically connected with the film hole.

In yet another aspect, the invention relates to an engine component for a gas turbine engine, the gas turbine engine generating hot combustion gas flow, having a substrate having a hot surface facing the hot combustion gas flow and a cooling surface facing a cooling fluid flow, the hot combustion gas flow generally defining an upstream direction and a downstream direction relative to the hot surface, a film hole extending through the substrate and having an inlet provided on the cooling surface, an outlet provided on the hot surface, and a passage connecting the inlet and the outlet, a flow conditioning structure comprising a projection from the hot surface provided downstream of the outlet on the hot surface, wherein the projection is configured to induce the cooling fluid flow emerging from the outlet to adhere to the hot surface, and a buffer region between the outlet and the projection such that the projection is not physically connected with the film hole.

DESCRIPTION OF EMBODIMENTS OF THE INVENTION

The described embodiments of the present invention are directed to a film-cooled engine component, particularly in a gas turbine engine. For purposes of illustration, aspects of the present invention will be described with respect to an aircraft gas turbine engine. It will be understood, however, that the invention is not so limited and may have general applicability in non-aircraft applications, such as other mobile applications and non-mobile industrial, commercial, and residential applications.

Figure 1:
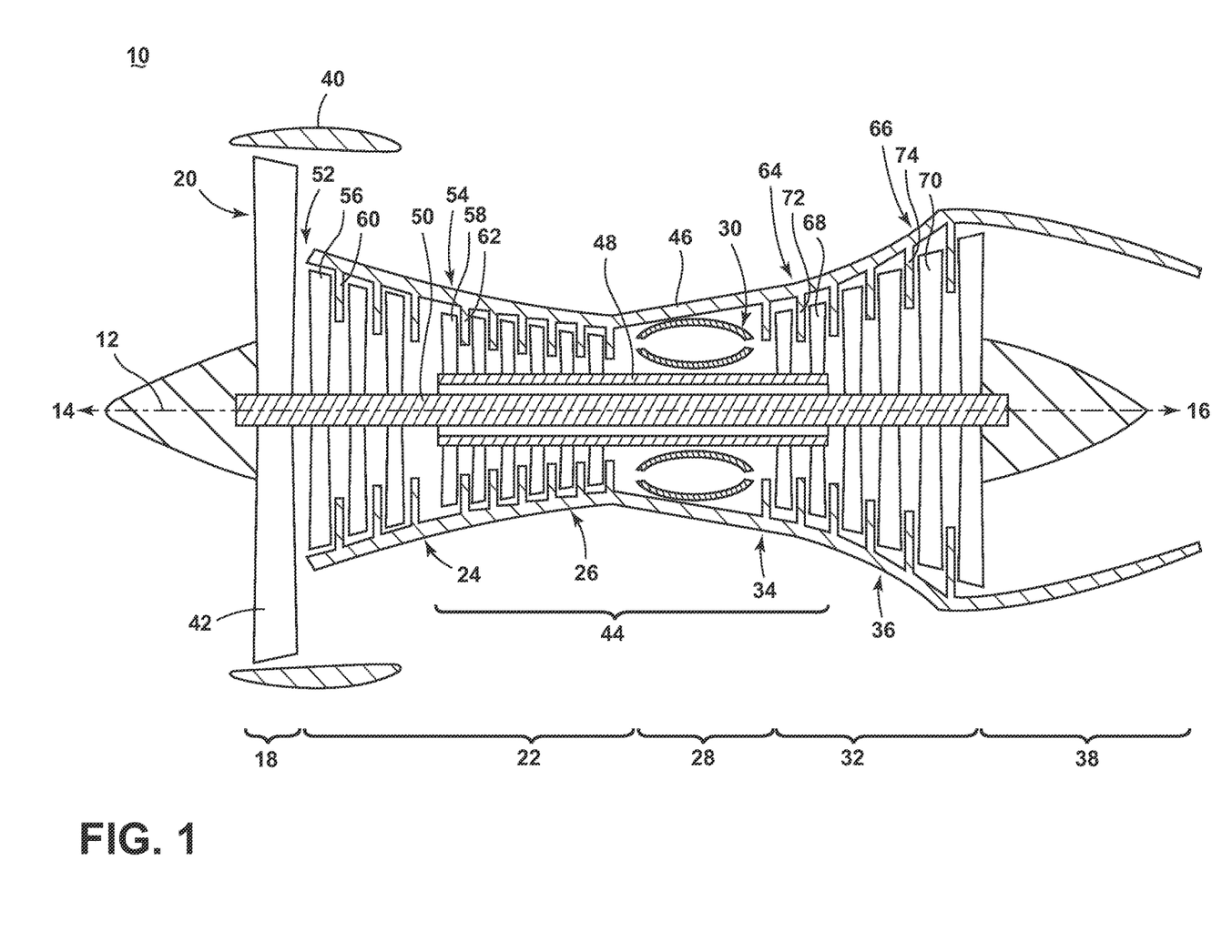
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by a core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid may be, but is not limited to, fluid discharged from the LP compressor 24 or the HP compressor 26.

Figure 2:
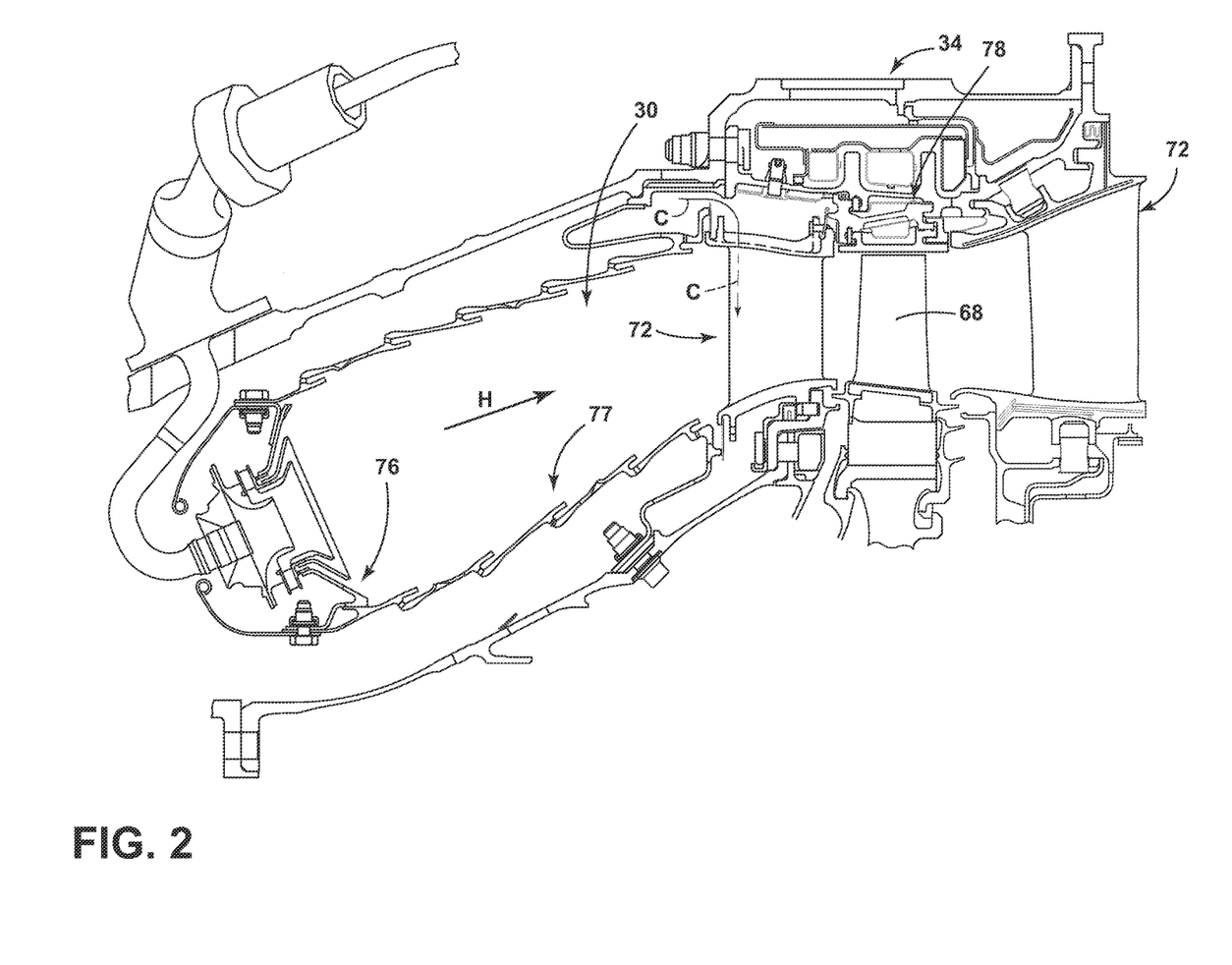
FIG. 2 is a side section view of a combustor and a high pressure turbine of the engine from FIG. 1.

FIG. 2 is a side section view of the combustor 30 and HP turbine 34 of the engine 10 from FIG. 1. The combustor 30 includes a deflector 76 and a combustor liner 77. Adjacent to the turbine blade 68 of the turbine 34 in the axial direction are sets of radially-spaced, static turbine vanes 72, with adjacent vanes 72 forming nozzles therebetween. The nozzles turn combustion gas to better flow into the rotating blades so that the maximum energy may be extracted by the turbine 34. A cooling fluid flow C passes through the vanes 72 to cool the vanes 72 as hot combustion gas flow H passes along the exterior of the vanes 72. A shroud assembly 78 is adjacent to the rotating blade 68 to minimize flow loss in the turbine 34. Similar shroud assemblies can also be associated with the LP turbine 36, the LP compressor 24, or the HP compressor 26.

One or more of the engine components of the engine 10 includes a film-cooled substrate in which a film hole of an embodiment disclosed further herein may be provided. Some non-limiting examples of the engine component having a film-cooled substrate can include the blades 68, 70, vanes or nozzles 72, 74, combustor deflector 76, combustor liner 77, or shroud assembly 78, described in FIGS. 1-2. Other non-limiting examples where film cooling is used include turbine transition ducts and exhaust nozzles.

Figure 3:
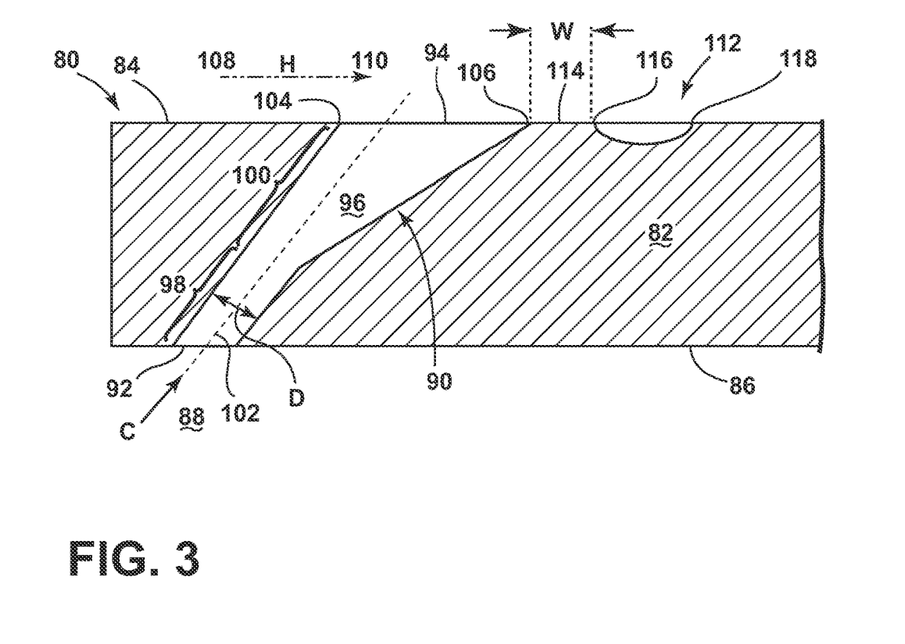
FIG. 3 is a schematic, sectional view through a film hole of an engine component of the engine from FIG. 1 according to a first embodiment of the invention.

FIG. 3 is a schematic, sectional view showing a portion of an engine component 80 according to a first embodiment of the invention. The engine component 80 may be an engine component of the engine 10 from FIG. 1, and can be disposed in a flow of hot gas represented by arrow H. A cooling fluid flow, represented by arrow C may be supplied to cool the engine component. As discussed above with respect to FIGS. 1-2, in the context of a turbine engine, the cooling air can be ambient air supplied by the fan 20 which bypasses the engine core 44, fluid from the LP compressor 24, or fluid from the HP compressor 26.

The engine component 80 includes a substrate 82 having a hot surface 84 facing the hot combustion gas flow H and a cooling surface 86 facing the cooling fluid C. The substrate 82 may form a wall of the engine component 80; the wall may be an exterior or interior wall of the engine component 80. The first engine component 80 can define at least one interior cavity 88 comprising the cooling surface 86. The hot surface 84 may be an exterior surface of the engine component 80. In the case of a gas turbine engine, the hot surface 84 may be exposed to gases having temperatures in the range of 1000° C. to 2000° C. Suitable materials for the substrate 82 include, but are not limited to, steel, refractory metals such as titanium, or superalloys based on nickel, cobalt, or iron, and ceramic matrix composites. The superalloys can include those in equi-axed, directionally solidified, and single crystal structures.

The engine component 80 further includes one or more film hole(s) 90 extending through the substrate 82 that provide fluid communication between the interior cavity and the hot surface 84 of the engine component 80. During operation, the cooling fluid flow C is supplied to the interior cavity 88 and out of the film hole 90 to create a thin layer or film of cool air on the hot surface 84, protecting it from the hot combustion gas flow H. While only one film hole 90 is shown in FIG. 3, it is understood that the engine component 80 may be provided with multiple film holes 90, which be arranged in any desired configuration on the engine component 80.

It is noted that, in any of the embodiments discussed herein, although the substrate 82 is shown as being generally planar, it is understood that that the substrate 82 may be curved for many engine components 80. However, the curvature of the substrate 82 may be slight in comparison to the size of the film hole 90, and so for the purposes of discussion and illustration, the substrate 82 is shown as planar. Whether the substrate 82 is planar or curved local to the film hole 90, the hot and cooling surfaces 84, 86 may be parallel to each other as shown herein, or may lie in non-parallel planes.

The film hole 90 can have an inlet 92 provided on the cooling surface 86 of the substrate 82, an outlet 94 provided on the hot surface 84, and a passage 96 connecting the inlet 92 and the outlet 94. The passage 96 can include a metering section 98 for metering of the mass flow rate of the cooling fluid flow C, and a diffusing section 100 in which the cooling fluid C may expand to form a wider cooling film. The metering section 98 can be a portion of the passage 96 with the smallest cross-sectional area perpendicular to the direction of cooling fluid flow C through the passage 96. The metering section 98 may be a discrete location at which the passage has the smallest cross-sectional area, or an elongated section of the passage 96. The diffusing section 100 is downstream of the metering section 98 with respect to the direction of cooling fluid flow C through the passage 96. The diffusing section 100 may be in serial flow communication with the metering section 98. The metering section 98 can be provided at or near the inlet 92, while the diffusing section 100 can be defined at or near the outlet 94.

The cooling fluid flow C through the passage 96 is along the longitudinal axis of the passage 96, also referred to herein as the centerline 102, which passes through the geometric center of the cross-sectional area of the metering section 98. The film hole 90 can be inclined in a downstream direction of cooling fluid flow C through the passage 96 such that the centerline 102 is non-orthogonal to the hot and cooling surfaces 84, 86. Alternatively, the film hole 90 may have a centerline 102 that is orthogonal to one or both of the hot and cooling surfaces 84, 86 in the localized area of the substrate 82 through which the centerline 102 passes. In other embodiments, the centerline 102 of the film hole 90 may not be oriented in the direction of the hot combustion gas flow H, such that the vector of the cooling fluid flow C differs from that of the hot combustion gas flow H. For example, a film hole that has a compound angle defines a cooling flow vector that differs from the hot combustion gas flow vector not only in cross section, but also in the top-down view looking at the hot surface 84.

The outlet 94 includes an upstream edge 104 and a downstream edge 106 at which the passage 96 intersects the hot surface 84 of the substrate 82. The edges 104, 106 can generally be defined relative to the direction of the hot combustion gas flow H, with the hot combustion gas flow H generally defining an upstream direction 108 and a downstream direction 110 relative to the hot surface 84, i.e. past the outlet 94. The upstream edge 104 generally faces the downstream direction 110 and the downstream edge 106 generally faces the upstream direction 108.

The engine component 80 is further provided with a flow conditioning structure 112 on the hot surface 84 of the substrate 82. The flow conditioning structure 112 is downstream of and physically spaced from the outlet 94 and is configured to induce the cooling fluid flow C emerging from the outlet 94 to more effectively adhere to the hot surface 84.

In the illustrated embodiment, the flow conditioning structure 112 comprises at least one recess in the hot surface 84. The recess 112 is not immediately adjacent to the outlet 94, but rather is separated from the outlet 94 by a buffer region 114 such that the recess 112 is not physically connected with the film hole 90. When viewed in cross-section, as in FIG. 3, the recess 112 has an upstream edge 116 and a downstream edge 118 generally defined relative to the direction of the hot combustion gas flow H. The upstream edge 116 generally faces the downstream direction 110 and the downstream edge 118 generally faces the upstream direction 108. The recess 112 can be centered with respect to the centerline 102 of the film hole 90, and may extend at least partially around the outlet 94.

The buffer region 114 extends between the downstream edge 106 of the outlet 94 and the upstream edge 116 of the recess 112. The buffer region 114 may comprise an area of the hot surface 84 between the outlet 94 and the recess 112, where the area does not include any portion of the film hole 90 or recess 112.

The buffer region 114 defines a width W between the downstream edge 106 of the outlet 94 and the upstream edge 116 of the recess 112. The width W of the buffer region 114 can vary, from being very small such that the recess 112 is close to the outlet 94, to larger such that the recess 112 is spaced farther from the outlet 94. On the minimum end of the range of possible widths W, the buffer region 114 can be large enough to allow the film hole 90 and recess 112 to be formed without damaging the other. The buffer region 114 keeps the outlet 94 of the film hole 90 and its exit shaping separated in function and space from the recess 112. This not only maintains accurate manufacturing of each element, including allowing for required tolerances, but also allows the cooling fluid flow C to fully form or spread at the outlet 94 of the film hole 90 before encountering the recess 112 or other flow conditioning feature that modifies this flow. On the maximum end of the range of possible widths W, the buffer region 114 may not be so far away as to negate its conditioning effect on the fluid flow; as such, the maximum possible width W may be dependent on the momentum of the cooling fluid flow C. Thus, the width W of the buffer region 114 preferably falls within the following range 0.5 D to 5 D, where D is the metering diameter defined by the metering section 98 of the film hole 90. That is, the width W of the buffer region 114 is preferably between one-half and five times the metering diameter D.

It is noted that the term "metering diameter (D)" as used with respect to the metering section 98 of this or any other embodiments of the invention is not meant to limit the metering section 98 to any particular cross-section, where the cross-section of the metering section 98 is determined perpendicular to the direction of the cooling fluid flow C through the passage 96. In this embodiment, the metering section 98 is generally circular in cross-section. However the specific cross-sectional shape of the metering section 98 may differ for other embodiment of the invention; for example, the cross-sectional shape of the metering section 98 may be rectangular or elliptical. For non-circular metering sections 98, the metering diameter D may be the hydraulic diameter of the cross-section, which is defined commonly as four times the cross-sectional area divided by the cross-sectional perimeter. For very irregular metering sections 98 that still are generally circular, such as those commonly produced by percussion laser machining, the metering diameter D may be the diameter of the largest circular pin that can be passed through the metering section 98 without damage. For non-circular sections that also have irregular surfaces, the metering diameter D may be the hydraulic diameter of the appropriately shaped largest pin that can be passed through without damage. For non-straight or non-constant cross section lengths prior to the diffusion section 100, the same overall definitions may be used at the minimum cross sectional area location.

The configuration of the recess 112 for inducing the cooling fluid flow C emerging from the outlet 94 to adhere to the hot surface 84 may be at least partially defined by the cross-sectional shape of the recess 112. The illustrated recess 112 has a cross-sectional shape that is generally concave or inwardly curved between the upstream and downstream edges 116, 118, with the edges 116, 118 meeting or blending into the hot surface 84. The cross-sectional shape of the recess 112 may remain substantially constant or may vary, as described in further detail below.

Figure 4:
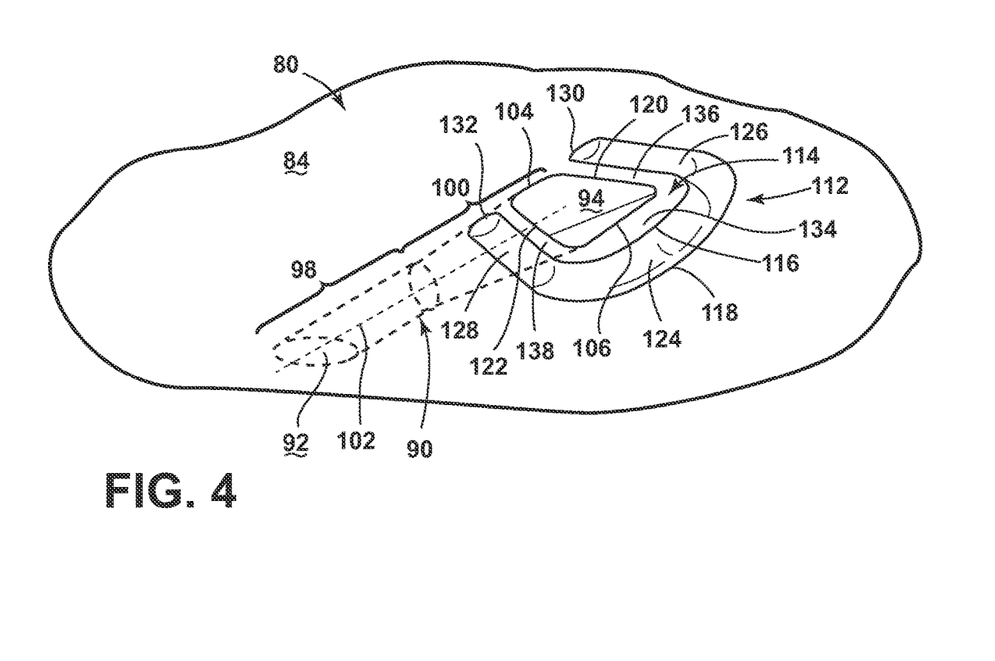
FIG. 4 is a perspective view of the hot surface of the engine component from FIG. 3.

FIG. 4 is a perspective view of the hot surface 84 of the engine component 80 from FIG. 3. The outlet 94 meets the hot surface 84 at a perimeter which includes the upstream and downstream edges 104, 106 of the outlet 94. The recess 112 also meets the hot surface 84 at a perimeter which includes the upstream and downstream edges 116, 118 of the recess 112. Due to the buffer region 114, the recess perimeter is non-contiguous with the outlet perimeter.

The configuration of the recess 112 for inducing the cooling fluid flow C emerging from the outlet 94 to adhere to the hot surface 84 may also be at least partially defined by the perimeter shape of the recess 112, and may be dependent on the shape of the outlet 94 for the film hole 90. More specifically, the perimeter of the recess 112 may be configured in relation to the perimeter of the outlet 94. The illustrated outlet 94 has a perimeter that is generally rectilinear in shape. Correspondingly, the illustrated recess 112 includes a perimeter that includes one or more linear segments. Other outlets 94 may have a rounded perimeter shape, and correspondingly the recess 112 can have one or more curved segments. The recess 112 may further have a combination of linear and curved segments about the outlet 94.

More specifically, the outlet 94 has a perimeter that is substantially trapezoidal in shape, with the substantially linear upstream edge 104 being joined with the substantially linear downstream edge 106 by substantially linear side edges 120, 122 that diverge from each other in the downstream direction. The side edges 120, 122 may blend with the upstream and downstream edges 104, 106 as smooth curves rather than a sharp corner or fillet.

The recess 112 has a perimeter that substantially follows the shape of the outlet 94, and includes multiple linear segments, including a medial portion 124 and two lateral portions 126, 128 that extend from the ends of the medial portion 124. The medial portion 124 can be generally downstream of the downstream edge 106 of the outlet 94, and the lateral portions 126, 128 can be generally adjacent to the side edges 120, 122, respectively of the outlet 94, relative to the centerline 102. Each lateral portion 126, 128 has a free end 130, 132, respectively that tapers or blends into the hot surface 84.

In the illustrated embodiment, the medial and lateral portions 124, 126, 128 are continuous with each other and collectively define a single recess 112. In other embodiments, one or both of the lateral portions 126, 128 may be separate from the medial portion 124 to form more than one recess. Thus, the flow conditioning structure can be collectively defined by multiple recesses in the hot surface 84.

For the film hole 90 illustrated, in which the recess 112 is substantially axisymmetric about the centerline 102, with the medial portion 124 being centered with respect to the centerline 102 and the lateral portions 126, 128 extending equidistantly around the outlet 94. In other embodiments of the invention, the recess 112 may be asymmetric about the centerline 102. Further in the illustrated embodiment, the lateral portions 126, 128 extend substantially to the upstream edge 104 of the outlet 94. In other embodiments, the lateral portions 126, 128 may extend only partially along the side edges 120, 122, or the recess 112 may lack any lateral portions.

The cross-sectional shape of the recess 112 may remain substantially constant along the medial and lateral portions 124, 126, 128. For example, the cross-sectional shape may be generally concave or inwardly curved as shown in FIG. 3 at the lateral portions 126, 128 as well as the medial portion 124. In other embodiments, the cross-sectional shape may vary along one or more of the portions 124, 126, 128 to compensate for changing fluid conditions at these locations. For example, the recess 112 may be deeper at the medial portion 124 and shallower at the lateral portions 126, 128 to taper in the upstream direction 108. In other non-limiting examples, the recess 112 can have a serrated or periodic cross-sectional shape.

The buffer region 114 also follows the shape of the outlet 94 and recess 112, and extends around the downstream and lateral edges 106, 120, 122 of the outlet 94. The buffer region 114 includes a medial region 134 extending between the downstream edge 106 of the outlet 94 and the medial portion 124 of the recess 112, and two lateral regions 136, 138 respectively extending between the side edges 120, 122 of the outlet 94 and the lateral portions 126, 128 of the recess 112.

Figure 5:
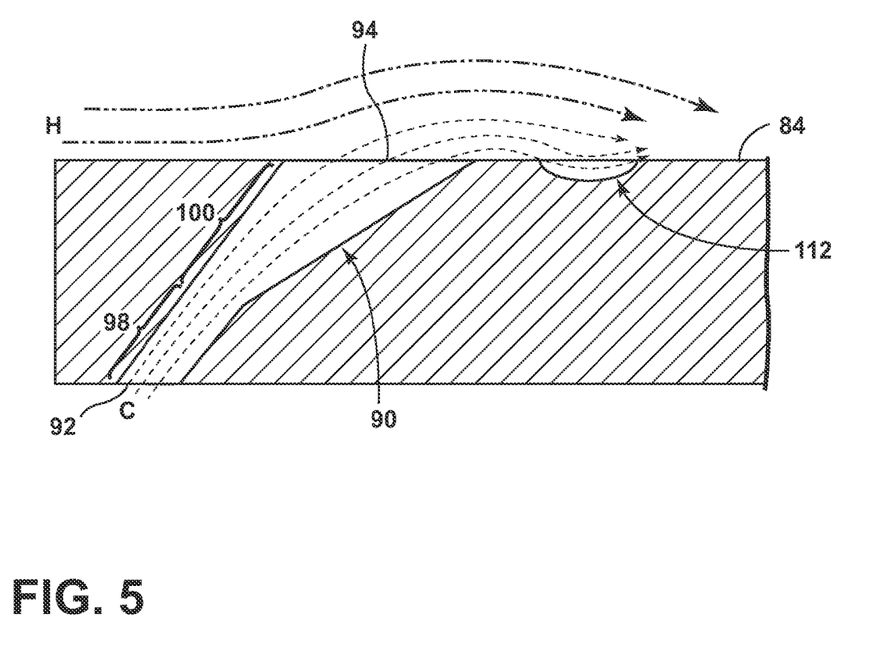
FIGS. 5-6 are views similar to FIGS. 3-4, respectively, and show the flow of hot combustion gas and cooling fluid relative to the engine component.
Figure 6:
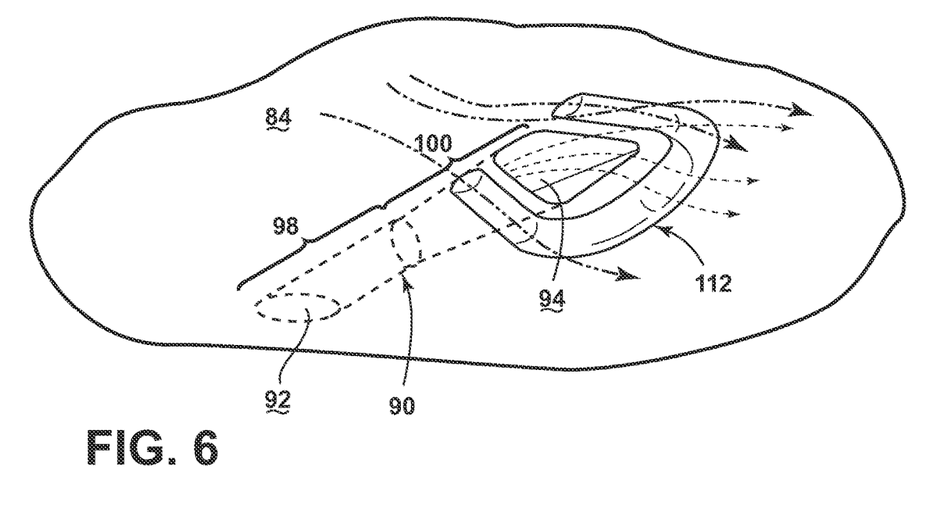

FIGS. 5-6 are views similar to FIGS. 3-4, respectively, and show the flow of hot combustion gas and cooling fluid relative to the engine component 80. In operation, cooling fluid flow C enters the film hole 90 through the inlet 92 and passes through the metering section 98 and diffusing section 100 before exiting the film hole 90 at the outlet 94 along the hot surface 84. Excessive penetration of the cooling fluid flow C into the hot combustion gas flow H as the cooling fluid flow C leaves the outlet 94 can result in the cooling fluid flow C being immediately swept away from the hot surface 84 of the substrate 82, which reduces the cooling efficiency of the fluid from film hole 90. The recess 112 induces the cooling fluid flow C emerging from the outlet 94 to adhere to the hot surface 84. Specifically, the recess 112 helps the cooling fluid flow C remain attached to the hot surface 84 of the substrate 82 as a film of cooling fluid downstream of the outlet 94. The recess 112 extending both along the downstream and side edges of the outlet 94 acts as a boundary layer trap, which reduces the detrimental effects of excessive interaction of the cooling fluid flow C with the hot combustion gas flow H by conditioning the region immediately outside the film hole 90 to induce the cooling fluid flow C to remain close to the hot surface 84 and mix less with the hot combustion gas flow H. The recess 112 conditions the hot surface 84 downstream of and adjacent to the outlet 94 to shape the cooling fluid flow C, manipulating the cooling boundary layer as it is formed on the hot surface 84 to prevent more of the hot combustion gas flow H from being mixed with the cooling fluid near the outlet region.

Figure 7:
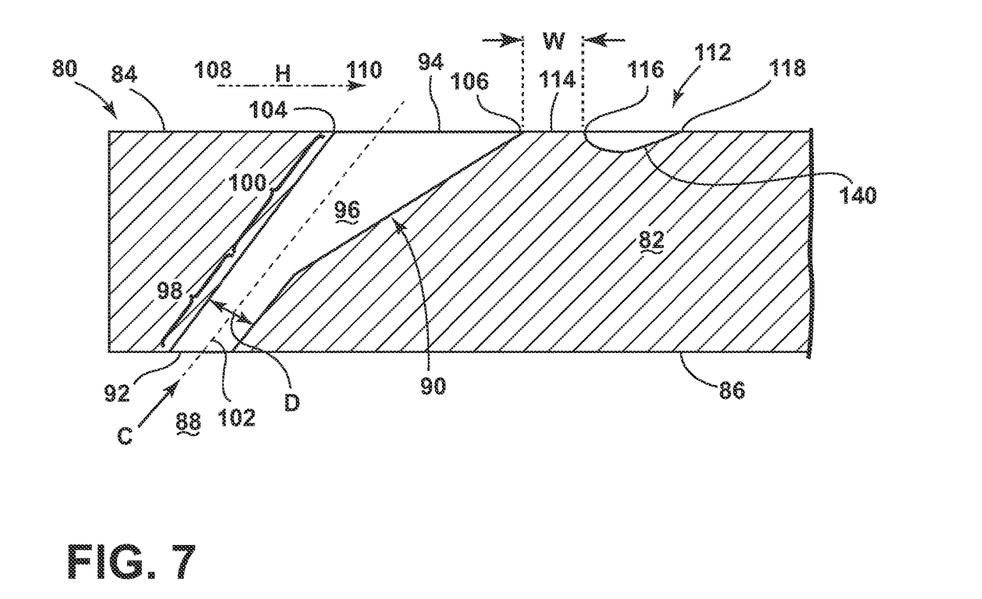
FIG. 7 is a schematic, sectional view through a film hole of an engine component of the engine from FIG. 1 according to a second embodiment of the invention.

FIG. 7 is a schematic, sectional view showing the engine component 80 having a flow conditioning structure according to a second embodiment of the invention. The engine component 80 is substantially identical to the engine component of the first embodiment, and like elements are indicated by like reference numerals. The second embodiment differs from the first embodiment in that the recess 112 is tapered in the downstream direction, with respect to the hot combustion gas flow H. The illustrated recess 112 has a cross-sectional shape that is generally concave or inwardly curved from the upstream edge 116, and includes a taper 140 in the downstream direction such that the downstream edge 118 blends into the hot surface 84.

Figure 8:
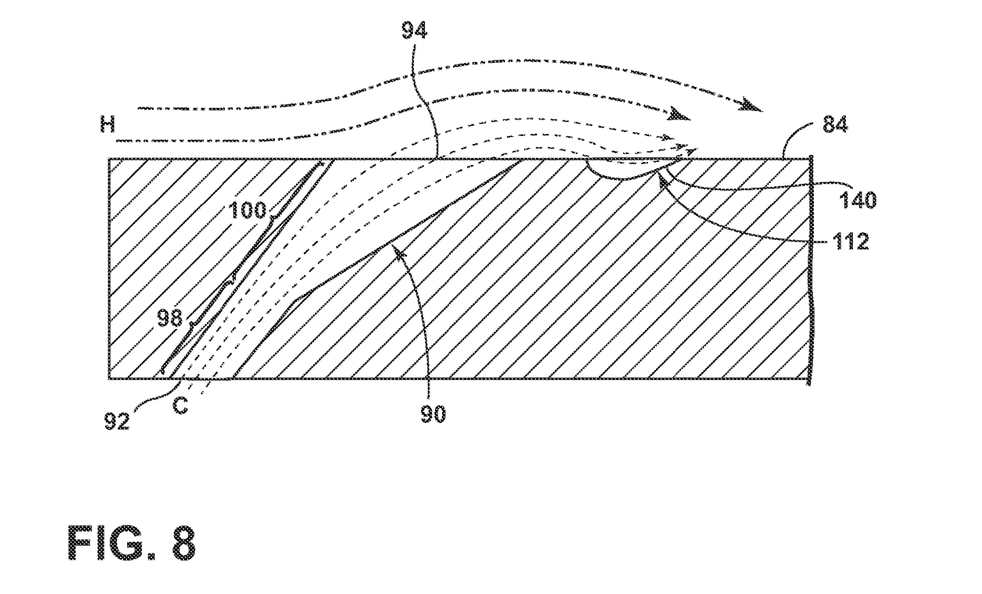
FIG. 8 is a view similar to FIG. 7, and shows the flow of hot combustion gas and cooling fluid relative to the engine component.

FIG. 8 shows the flow of hot combustion gas and cooling fluid relative to the engine component 80. The flow patterns of the hot combustion gas flow H as the cooling fluid flow C may be substantially similar to those described above for the first embodiment in FIGS. 5-6. The provision of the taper 140 on the recess 112 reduces or eliminates the generation of fluid vortices by the recess 112 under certain circumstances that may counteract some of the gain in cooling effectiveness provided by the recess 112.

Figure 9:
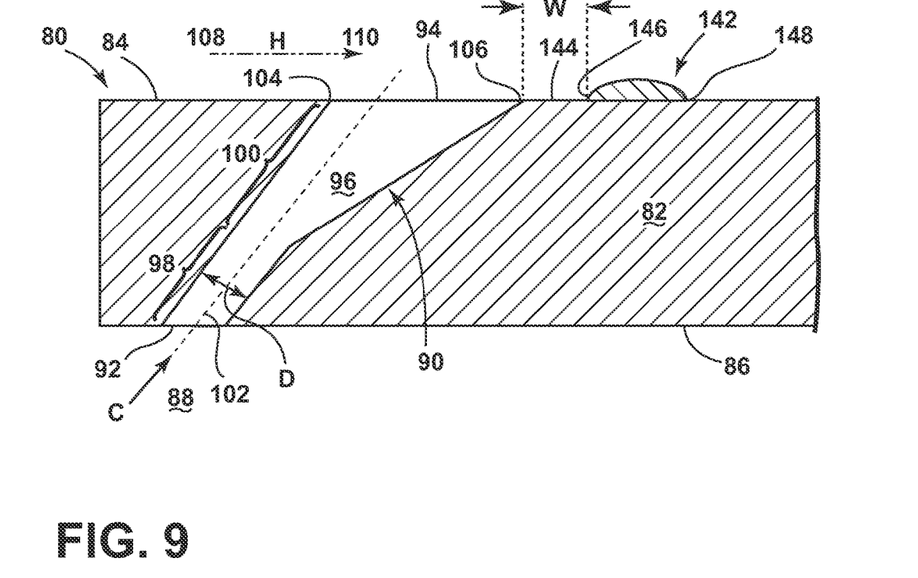
FIG. 9 is a schematic, sectional view through a film hole of an engine component of the engine from FIG. 1 according to a third embodiment of the invention.

FIG. 9 is a schematic, sectional view showing the engine component 80 having a flow conditioning structure according to a third embodiment of the invention. The engine component 80 is substantially identical to the engine component of the first embodiment, and like elements are indicated by like reference numerals. The third embodiment differs from the first embodiment in that the flow conditioning structure comprises at least one projection 142 from the hot surface 84. The projection 142 is not immediately adjacent to the outlet 94, but rather is separated from the outlet 94 by a buffer region 144 such that the projection 142 is not physically connected with the film hole 90. When viewed in cross-section, as in FIG. 9, the projection 142 has an upstream edge 146 and a downstream edge 148 generally defined relative to the direction of the hot combustion gas flow H. The upstream edge 146 generally faces the upstream direction 108 and the downstream edge 148 generally faces the downstream direction 110. The projection 142 can be centered with respect to the centerline 102 of the film hole 90, and may extend at least partially around the outlet 94.

The buffer region 144 extends between the downstream edge 106 of the outlet 94 and the upstream edge 146 of the projection 142. The buffer region 144 may comprise an area of the hot surface 84 between the outlet 94 and the projection 142, where the area does not include any portion of the film hole 90 or projection 142.

The buffer region 144 defines a width W between the downstream edge 106 of the outlet 94 and the upstream edge 146 of the projection 142. The width W of the buffer region 144 can vary, from being very small such that the projection 142 is close to the outlet 94, to larger such that the projection 142 is spaced farther from the outlet 94. On the minimum end of the range of possible widths W, the buffer region 144 can be large enough to allow the film hole 90 and projection 142 to be formed without damaging the other. The buffer region 144 keeps the outlet 94 of the film hole 90 and its exit shaping separated in function and space from the projection 142. This not only maintains accurate manufacturing of each element, including allowing for required tolerances, but also allows the cooling fluid flow C to fully form or spread at the outlet 94 of the film hole 90 before encountering the projection 142 or other flow conditioning feature that modifies this flow. On the maximum end of the range of possible widths W, the buffer region 144 may not be so far away as to negate its conditioning effect on the fluid flow; as such, the maximum possible width W may be dependent on the momentum of the cooling fluid flow C. Thus, the width W of the buffer region 144 preferably falls within the following range 0.5 D to 5 D, where D is the metering diameter defined by the metering section 98 of the film hole 90. That is, the width W of the buffer region 144 is preferably between one-half and five times the metering diameter D.

The configuration of the projection 142 for inducing the cooling fluid flow C emerging from the outlet 94 to adhere to the hot surface 84 may be at least partially defined by the cross-sectional shape of the projection 142. The illustrated projection 142 has a cross-sectional shape that is generally convex or outwardly curved between the upstream and downstream edges 146, 148, with the edges 146, 148 meeting or blending into the hot surface 84. The cross-sectional shape of the projection 142 may remain substantially constant or may vary, as described in further detail below.

Figure 10:
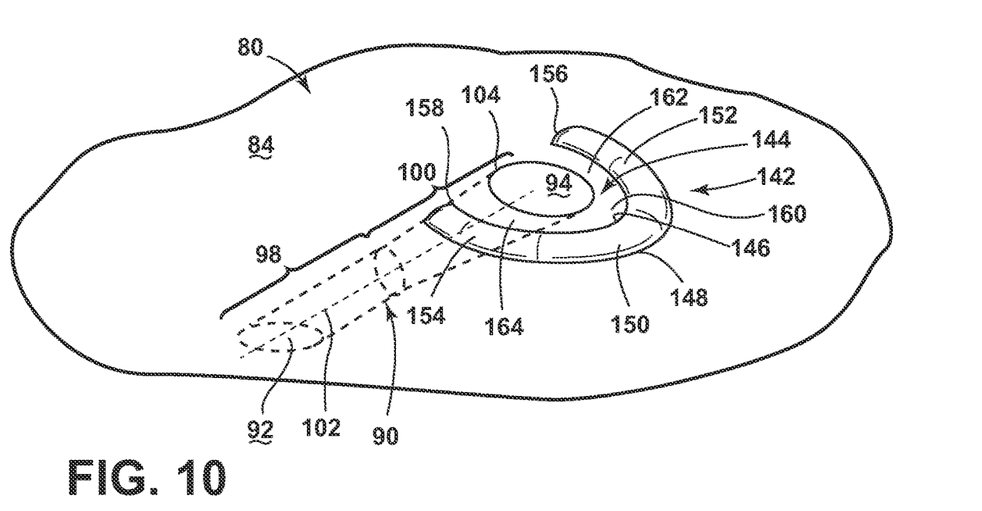
FIG. 10 is a perspective view of the hot surface of the engine component from FIG. 9.

FIG. 10 is a perspective view of the hot surface 84 of the engine component 80 from FIG. 9. The outlet 94 of the third embodiment can have a difference perimeter shape than for the first embodiment. The illustrated outlet 94 has a perimeter that is generally rounded in shape. Correspondingly, the illustrated projection 142 includes a perimeter that includes one or more curved segments. Other outlets 94 may have a rectilinear perimeter shape, and correspondingly the projection 142 can have one or more linear segments. The projection 142 may further have a combination of linear and curved segments about the outlet 94. Due to the buffer region 144, the projection perimeter is non-contiguous with the outlet perimeter.

More specifically, the outlet 94 has a perimeter that is substantially elliptical in shape, with the upstream and downstream edges 104, 106 curving to meet each other. The projection 142 has a perimeter that substantially follows the shape of the outlet 94, and is curved in a horse-shoe shape, including a medial portion 150 and two lateral portions 152, 154 that extend from the ends of the medial portion 150. The medial portion 150 can be generally downstream of the downstream edge 106 of the outlet 94, and the lateral portions 152, 154 can be generally adjacent to the outlet 94, relative to the centerline 102. Each lateral portion 152, 154 has a free end 156, 158, respectively that tapers or blends into the hot surface 84.

In the illustrated embodiment, the medial and lateral portions 150, 152, 154 are continuous with each other and collectively define a single projection 142. In other embodiments, one or both of the lateral portions 152, 154 may be separate from the medial portion 150 to form more than one projection. Thus, the flow conditioning structure can be collectively defined by multiple projections in the hot surface 84.

For the film hole 90 illustrated, in which the projection 142 is substantially axisymmetric about the centerline 102, with the medial portion 150 being centered with respect to the centerline 102 and the lateral portions 152, 154 extending equidistantly around the outlet 94. In other embodiments of the invention, the projection 142 may be asymmetric about the centerline 102. Further in the illustrated embodiment, the lateral portions 152, 154 extend substantially to the upstream edge 104 of the outlet 94. In other embodiments, the lateral portions 152, 154 may extend only partially along the outlet 94, or the projection 142 may lack any lateral portions.

The cross-sectional shape of the projection 142 may remain substantially constant along the medial and lateral portions 150, 152, 154. For example, the cross-sectional shape may be generally convex or outwardly curved as shown in FIG. 9 at the lateral portions 152, 154 as well as the medial portion 150. In other embodiments, the cross-sectional shape may vary along one or more of the portions 150, 152, 154 to compensate for changing fluid conditions at these locations. For example, the projection 142 may be deeper at the medial portion 150 and shallower at the lateral portions 152, 154 to taper in the upstream direction 108. In other examples, the projection 142 can have a serrated or periodic cross-sectional shape.

The buffer region 144 also follows the shape of the outlet 94 and projection 142, and extends around the outlet 94. The buffer region 144 includes a medial region 160 extending between the downstream edge 106 of the outlet 94 and the medial portion 150 of the projection 142, and two lateral regions 162, 164 respectively extending between the side outlet 94 and the lateral portions 152, 154 of the projection 142.

Figure 11:
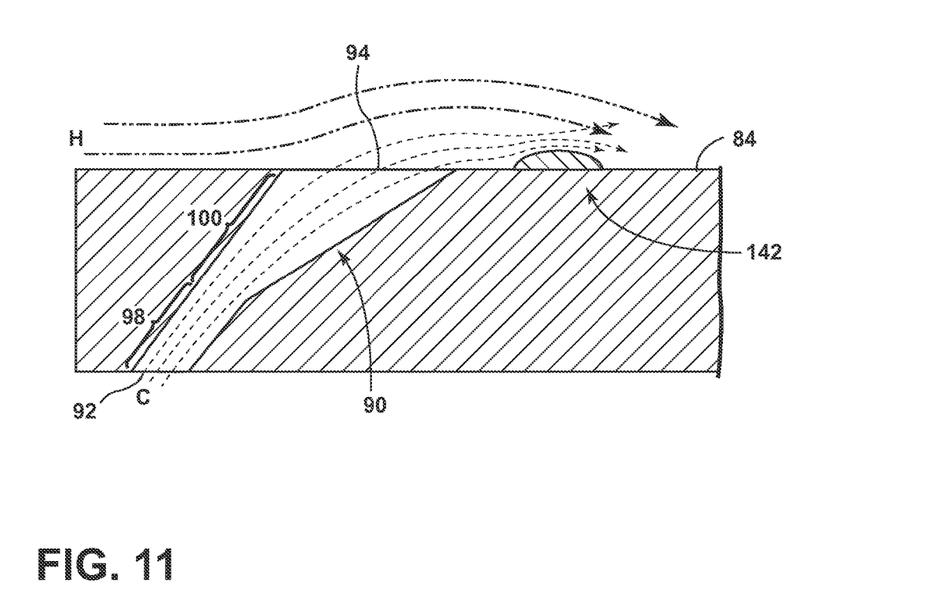
FIGS. 11-12 are views similar to FIGS. 9-10, respectively, and show the flow of hot combustion gas and cooling fluid relative to the engine component.
Figure 12:
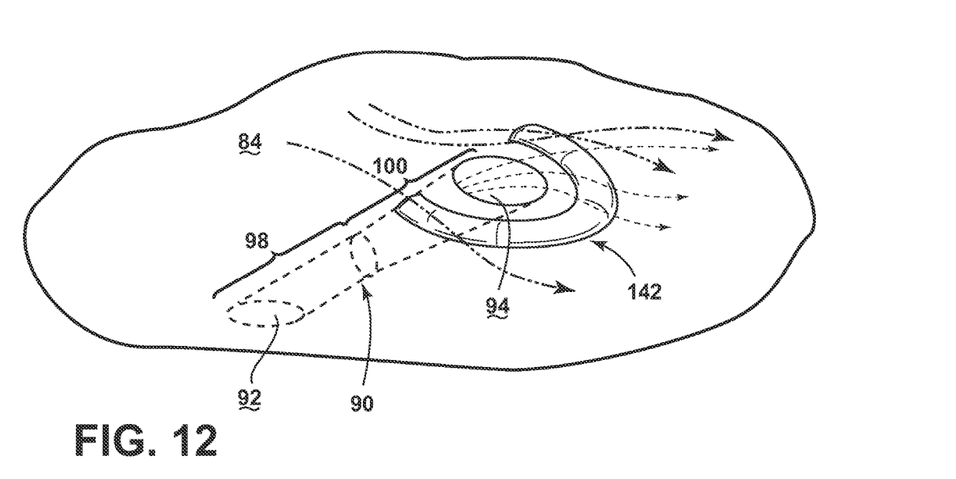

FIGS. 11-12 are views similar to FIGS. 9-10, respectively, and show the flow of hot combustion gas and cooling fluid relative to the engine component 80. In operation, cooling fluid flow C enters the film hole 90 through the inlet 92 and passes through the metering section 98 and diffusing section 100 before exiting the film hole 90 at the outlet 94 along the hot surface 84. As described above with respect to FIGS. 5-6, excessive penetration of the cooling fluid flow C into the hot combustion gas flow H as the cooling fluid flow C leaves the outlet 94 can result in the cooling fluid flow C being immediately swept away from the hot surface 84 of the substrate 82, which reduces the cooling efficiency of the fluid from the film hole 90. The projection 142 induces the cooling fluid flow C emerging from the outlet 94 to adhere to the hot surface 84. Specifically, the projection 142 helps the cooling fluid flow C remain attached to the hot surface 84 of the substrate 82 as a film of cooling fluid downstream of the outlet 94. The projection 142 conditions the hot surface 84 downstream of and adjacent to the outlet 94 to shape the cooling fluid flow C, manipulating the cooling boundary layer as it is formed on the hot surface 84 to prevent more of the hot combustion gas flow H from mixing with the cooling fluid near the outlet region. The projection 142 further acts to deflect the host combustion gas flow H away from the cooling fluid flow C. By allowing the cooling fluid flow C to move up and over the projection 142, the hot combustion gas flow H is prevented from intruding under the cooling fluid flow C.

Figure 13:
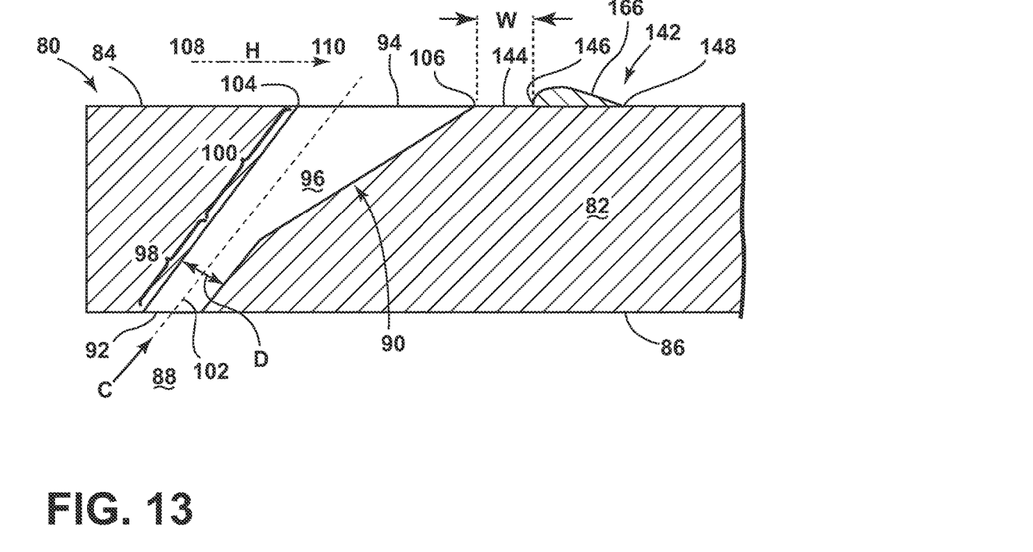
FIG. 13 is a schematic, sectional view through a film hole of an engine component of the engine from FIG. 1 according to a fourth embodiment of the invention.

FIG. 13 is a schematic, sectional view showing the engine component 80 having a flow conditioning structure according to a fourth embodiment of the invention. The engine component 80 is substantially identical to the engine component of the third embodiment, and like elements are indicated by like reference numerals. The fourth embodiment differs from the third embodiment in that the projection 142 is tapered in the downstream direction, with respect to the hot combustion gas flow H. The illustrated projection 142 has a cross-sectional shape that is generally convex or outwardly curved from the upstream edge 146, and includes a taper 166 in the downstream direction such that the downstream edge 148 blends into the hot surface 84.

Figure 14:
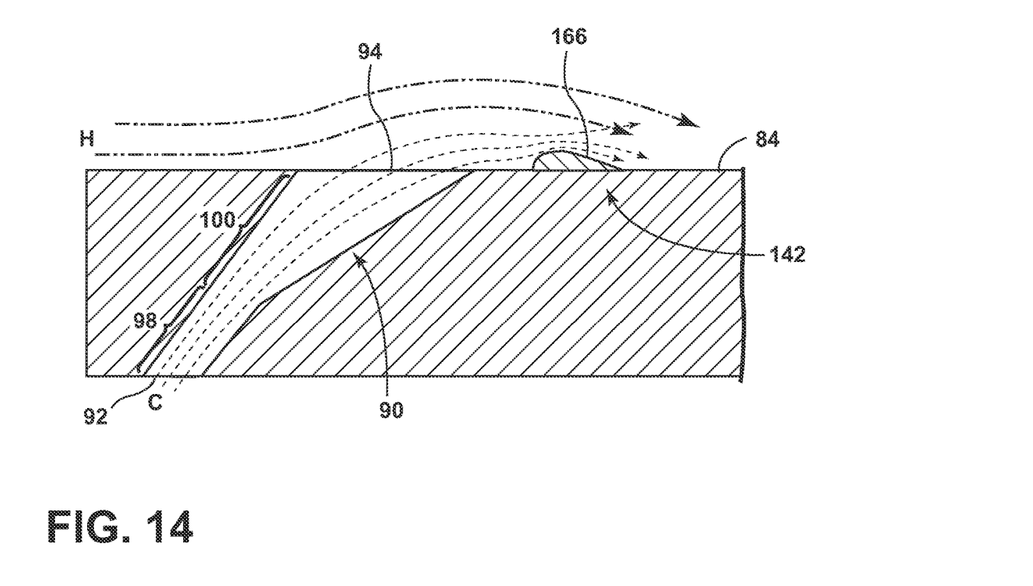
FIG. 14 is a view similar to FIG. 13, and shows the flow of hot combustion gas and cooling fluid relative to the engine component.

FIG. 14 shows the flow of hot combustion gas and cooling fluid relative to the engine component 80. The flow patterns of the hot combustion gas flow H as the cooling fluid flow C may be substantially similar to those described above for the third embodiment in FIGS. 11-12. The provision of the taper 166 on the projection 142 reduces or eliminates the potential for flow separation at the projection 142.

Embodiments of the present invention may be combined with shaping or contouring of the metering section and/or diffusing section of the film hole 90. Embodiments of the present invention may also be applied to film holes without a diffusing section. Embodiments of the present invention may also apply to slot-type film cooling, in which case the outlet 94 is provided within a slot on the hot surface 84. Further, in any of the above embodiments, a coating can be applied to the hot surface 84 of the substrate 82. Some non-limiting examples of coatings include a thermal barrier coating, an oxidation protection coating, or combinations thereof.

The various embodiments of devices and methods related to the invention disclosed herein provide improved cooling for engine structures, particularly in a turbine component having film holes. One advantage that may be realized in the practice of some embodiments of the described systems is that a flow conditioning structure can be provided downstream of the film hole outlet in order to condition the cooling fluid flow emerging from the outlet so as to adhere to the hot surface, thereby improving cooling efficiency. Another advantage that may be realized in the practice of some embodiments of the described devices is that the provision of a buffer region separating the flow conditioning structure from the outlet permits the film hole and flow conditioning structure to be formed on the engine component without sacrificing or impeding on any of the design features of either.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine component for a gas turbine engine, the gas turbine engine generating hot combustion gas flow, comprising:
    a substrate having a hot surface facing the hot combustion gas flow and a cooling surface facing a cooling fluid flow, the hot combustion gas flow generally defining an upstream direction and a downstream direction relative to the hot surface;
    a film hole extending through the substrate and having an inlet provided on the cooling surface, a film hole outlet provided on the hot surface, and a passage connecting the inlet and the film hole outlet;
    a flow conditioning structure, the flow conditioning structure comprising;
        a medial portion, the medial portion provided downstream of the outlet on the hot surface and having an upstream edge;
        at least one lateral portion provided a distance from a lateral edge of the film hole outlet; and
    a buffer region between the film hole outlet and the flow conditioning structure such that the flow conditioning structure is not physically connected with the film hole outlet,
    wherein the buffer region defines a width between the film hole outlet and the medial portion and the at least one lateral portion of the flow conditioning structure, and
    wherein the at least one lateral portion of the flow conditioning structure further extends upstream to an upstream edge of the film hole outlet.

2. The engine component of claim 1, wherein the buffer region comprises an area of the hot surface between the film hole outlet and the flow conditioning structure, wherein the passage comprises a metering section defining the inlet and a diffusing section defining the film hole outlet, the metering section comprising a metering diameter, and wherein the width defined by the buffer region is from 0.5 to 5 times the metering diameter.

3. The engine component of claim 2, the film hole outlet further comprising an outlet perimeter, wherein the flow conditioning structure comprises a recess in the hot surface, and wherein the buffer region is free from any portion of the film hole, the recess or any protrusion.

4. The engine component of claim 3, wherein the outlet recess perimeter comprises at least one curved or linear segment.

5. The engine component of claim 4, wherein the recess further comprises:
a first portion, the first portion inwardly curving from the upstream edge; and
a tapered downstream portion merging with the hot surface.

6. The engine component of claim 2, wherein the flow conditioning structure comprises a projection from the hot surface.

7. The engine component of claim 2, wherein metering section has a non-circular cross section and further comprises a hydraulic diameter; the hydraulic diameter being four times the cross-sectional area of the metering section divided by the cross-sectional perimeter of the metering section.

8. The engine component of claim 6, wherein the projection is defined by a perimeter having at least one curved or linear segment, the projection further comprising:
a first upstream portion, the first upstream portion outwardly curving from the upstream edge, and
a tapered downstream portion merging with the hot surface.

9. The engine component of claim 1, wherein the passage defines a centerline that is inclined in the downstream direction such that the centerline is non-orthogonal to the cooling surface and the hot surface, and
wherein the buffer region extends around the downstream and lateral edges of the film hole outlet.

10. The engine component of claim 1, wherein the medial portion of the flow conditioning structure comprises;
a downstream edge; and
a taper in the downstream direction,
wherein the engine component comprises one of a blade, a vane, a shroud, or a combustor liner, and
wherein the downstream edge blends into the hot surface at the taper in the downstream direction.

11. The engine component of claim 1 wherein the substrate comprises an exterior wall of the engine component which defines an interior to which the cooling fluid flow is supplied, and
wherein the buffer region extends equidistantly around the film hole outlet between the film hole outlet and the flow conditioning structure.

12. The engine component of claim 1, the flow conditioning structure further comprising;
more than one lateral portion extending laterally adjacent to the film hole outlet, on either side of the film hole outlet, on the hot surface,
wherein the buffer region comprises an area of the hot surface between the film hole outlet and the more than one lateral and medial portions of the flow conditioning structure.

13. The engine component of claim 12, wherein each lateral portion of the more than one lateral portion comprises a free upstream end that tapers into the hot surface.

14. The engine component of claim 13, wherein each lateral portion of the more than one lateral portion connects to the medial portion.

15. The engine component of claim 13, wherein each lateral portion of the more than one lateral portion does not connect to the medial portion.

16. The engine component of claim 15 comprising exactly one medial portion and exactly two lateral portions, wherein each one of the exactly two lateral portions is located on an opposite side of the film hole outlet from the other.

17. An engine component for a gas turbine engine, the gas turbine engine generating hot combustion gas flow, comprising:
a substrate having a hot surface facing the hot combustion gas flow and a cooling surface facing a cooling fluid flow, the hot combustion gas flow generally defining an upstream direction and a downstream direction relative to the hot surface;
a film hole extending through the substrate and having an inlet provided on the cooling surface, a film hole outlet provided on the hot surface, and a passage connecting the inlet and the film hole outlet;
a flow conditioning structure, the flow conditioning structure comprising;
a medial portion, the medial portion provided downstream of the outlet on the hot surface and having an upstream edge;
at least one lateral portion provided a distance from a lateral edge of the film hole outlet; and
a buffer region between the film hole outlet and the flow conditioning structure such that the flow conditioning structure is not physically connected with the film hole outlet,
wherein the buffer region defines a width between the film hole outlet and the medial portion and the at least one lateral portion of the flow conditioning structure,
wherein the flow conditioning structure comprises a recess, and
wherein the flow conditioning structure recess is deeper at the medial portion and shallower at the more than one lateral portion.

18. The engine component of claim 17, wherein the flow conditioning structure recess is asymmetric about a film hole centerline.

19. The engine component of claim 18, wherein the film hole outlet is trapezoidal.

20. An engine component for a gas turbine engine, the gas turbine engine generating hot combustion gas flow, comprising:
a substrate having a hot surface facing the hot combustion gas flow and a cooling surface facing a cooling fluid flow, the hot combustion gas flow generally defining an upstream direction and a downstream direction relative to the hot surface;
a film hole extending through the substrate and having an inlet provided on the cooling surface, a film hole outlet provided on the hot surface, and a passage connecting the inlet and the film hole outlet;
a flow conditioning structure, the flow conditioning structure comprising;
a medial portion, the medial portion provided downstream of the film hole outlet on the hot surface and having an upstream edge; and two lateral portions, each of the two lateral portions extending along one of a first and second linear side edges of the film hole outlet, each of the two lateral portions located on an opposite side of the film hole outlet from the other lateral portion, wherein the medial portion and each of the two lateral portions define recesses in the hot surface, and wherein the medial portion and the two lateral portions are continuous with each other and collectively define a single recess.

* * * * *